April 28, 1970     HIROSHI NAKAMURA     3,508,380
AUTOMATIC WRAPPING MACHINE
Filed Feb. 26, 1968     3 Sheets-Sheet 1
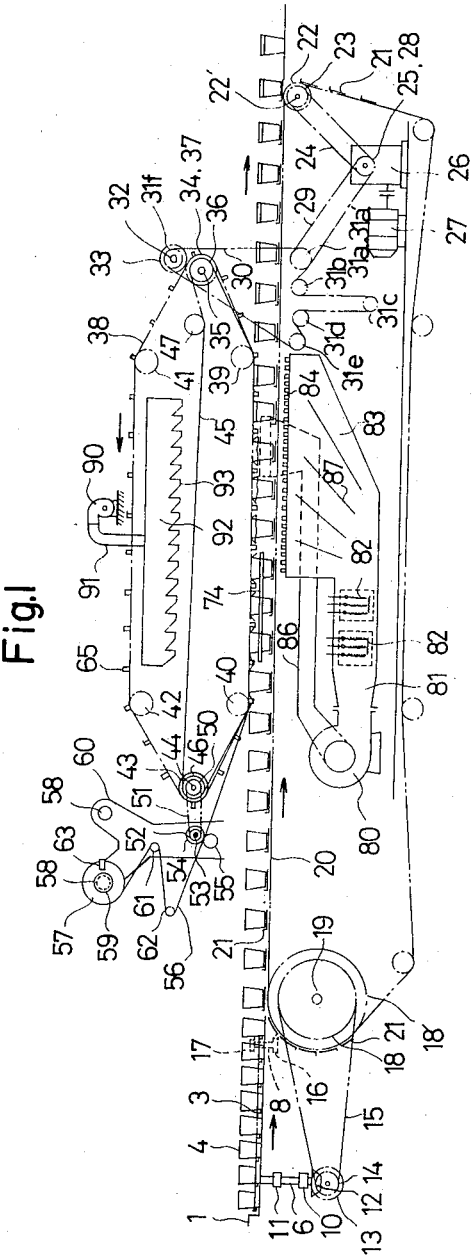
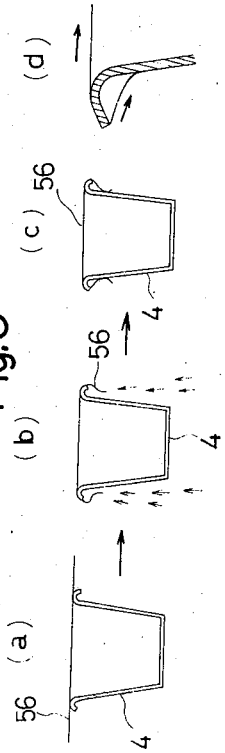
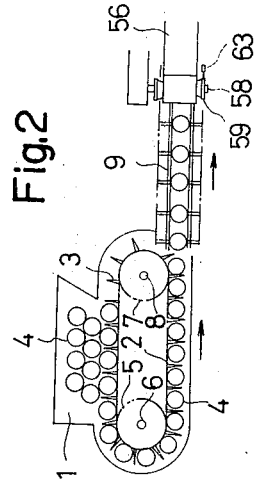

United States Patent Office 3,508,380
Patented Apr. 28, 1970

3,508,380
AUTOMATIC WRAPPING MACHINE
Hiroshi Nakamura, Kokubunji-shi, Tokyo, Japan, assignor to Nippon Carbide Kogyo Kabushiki Kaisha, Tokyo, Japan
Filed Feb. 26, 1968, Ser. No. 708,349
Claims priority, application Japan, Feb. 25, 1967, 42/11,731
Int. Cl. B65b 7/00, 7/28
U.S. Cl. 53—329                                    4 Claims

ABSTRACT OF THE DISCLOSURE

An apparatus for the continuous sealing of cup-shaped containers with a heat-shrinkable plastic film. A soft endless belt runs above and parallel to an endless cup-carrying conveyor and serves to pull the plastic film from a roll supply and to press the film against the rims of the containers while heat is applied to the exposed marginal portions. An endless chain runs on each side of the soft belt and carries film severing means transversely across the belt between each of the cups.

---

Figure 4:
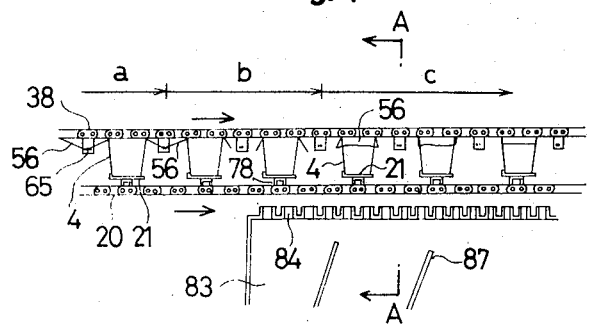

The invention relates to an automatic wrapping machine which provides continuous sealing of cup-shaped containers with content therein by covering open end of the container with a thermally shrinkable film and cutting the film around the container to leave a marginal portion extending outwardly of the peripheral rim of the container, the portion being subsequently sealed to the container by thermal shrinkage.

Conventional practice to provide such containers containing drinks, confectionary or other foodstuffs with seals has been to prepare initially separate films of proper size in excess of just covering the opening of each container and then to place each film on the individual containers before the latter is passed through a heat tunnel for causing heat shrinkage of the film on and around the outer rim of the opening of the container. As will be readily noted, such process involves difficulty in handling films by virtue of the film being light and readily shifted and the tendency of becoming charged by triboelectricity, since plasticcs are used as film material for most purposes. A grave disadvantage of such process is that it requires a manual operation which results in low efficiency.

Therefore, it is an object of the invention to provide an automatic wrapping machine which operates continuously to form a seal of a heat shrinkable film covering the opening of cup-shaped container without requiring manual operation.

According to the invention, an automatic wrapping machine comprises a chain conveyor carrying receptacles spaced apart along its length at a regular interval and having open space between adjacent receptacles, each of said receptacles being adapted to receive and hold a cup-shaped container thereon during its travel through a predetermined region, a supply of continuous web of heat shrinkable film, a soft belt of substantial width and upper chain link both arranged to run parallel to, but spaced from the chain conveyor over a part of said predetermined region so that the belt is engaged with the rim of top opening of the container as it is carried on the chain conveyor, said belt serving when the machine is initially started to grip the free end of said film between it and the rim to cause the film to cover the top opening and subsequently to keep the film lightly pressed against the rim of individual containers while at the same time serving to keep the film tensioned, said upper chain link being provided with a plurality of cutting means along its length at the same interval as said receptacles on the chain conveyor with each of the cutting means being positioned in said part to interspace adjacent receptacles, said upper chain link being driven at the same speed as the chain conveyor so as to cut the film transversely between adjacent containers while the film is held pressed by the belt, and means for applying heat through said open space to the cut film to thereby cause heat shrinkage of the cut film, whereby marginal portion of each individual cut film is sealed to the outer wall of the container.

In order for the invention to be better understood, an embodiment thereof will be described in further detail with reference to the drawing, wherein:

FIG. 1 is a schematic side elevation of an automatic wrapping machine in accordance with one embodiment of the invention, FIG. 2 is a plan view of a feeder used in the machine of FIG. 1, FIGS. 3a to 3d are schematic views illustrating the steps involved with the heat-sealing of top opening of a cup-shaped container.

Figure 5:
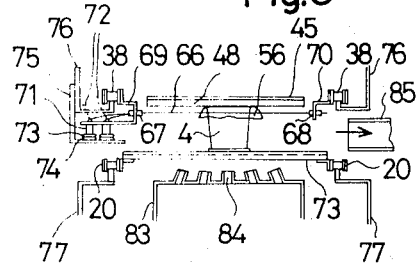
Figure 6:
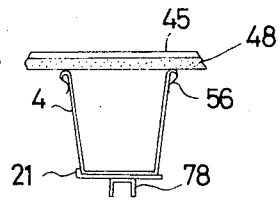
Figure 7:
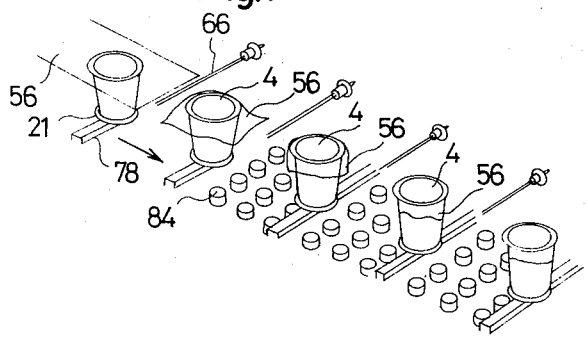
Figure 8:
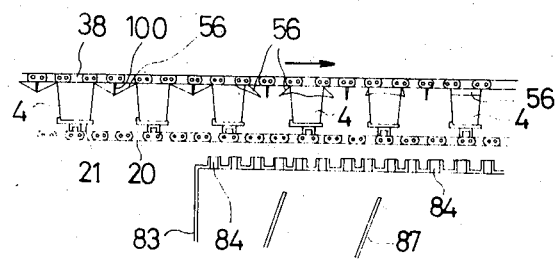
Figure 9:
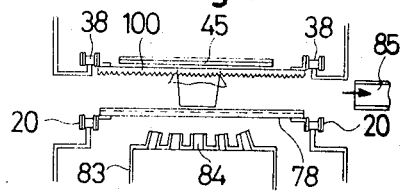
Figure 10:
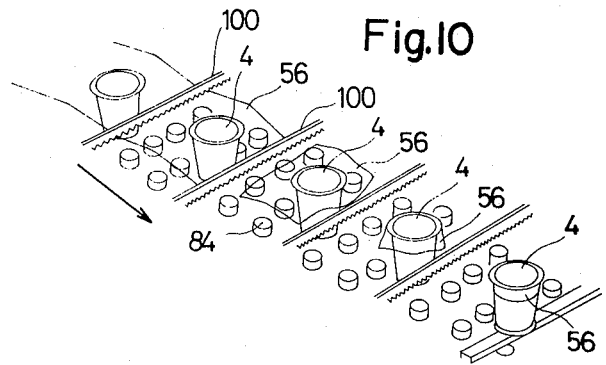

FIG. 4 is a fragmentary elevational view of the machine showing the film covering and sealing process, FIG. 5 is a cross-section along the line A—A in FIG. 4, FIG. 6 is a section showing that a film is lightly pressed by a soft belt against the rim of top opening of a container while it is carried on a chain conveyor, FIG. 7 is a perspective view of the film covering and sealing process with the belt and upper conveyor being removed for clarity, FIG. 8 shows, in elevation, another film cutting device incorporating a saw-toothed edge, FIG. 9 is a cross section of the device shown in FIG. 8, and FIG. 10 is a perspective view of the parts shown in FIG. 8, with belt and upper conveyor being omitted for clarity.

Referring to FIGS. 1 and 2 there is provided a feeder table 1, over which runs a circulating feeder chain 2 provided with a multiplicity of pawls 3 along its length at a constant spacing in excess of the diameter of containers 4 to be wrapped. The chain belt runs around and engages sprocket wheels 5, 7 mounted on vertical shafts 6, 8, respectively, to be driven thereby. The mounting shaft 6 is rotatably supported by a pair of spaced bearings 10, 11 and has secured at its one end a bevel gear 12 which meshes with a bevel gear 13. On the shaft on which the bevel gear 13 is mounted is secured a chain sprocket wheel 14 and a chain link 15 extends around the wheel 14 and another chain sprocket wheel 18 mounted on a shaft 19. In the embodiment shown, such shaft 19 is disposed horizontally and is rotatably supported at both ends by suitable means such as bearings. The provision of such bearing means would be self-evident and therefore will not be described for similar shafts which appear in subsequent description. On the shaft 19 is mounted another sprocket wheel 18′, and a conveyor chain link 20 provided with container receptacles 21 extends around the sprocket wheel 18′ and a driving sprocket wheel 22 on a shaft 22′ that is disposed adjacent to the delivery end of the machine. As shown in FIG. 1, several sprockets not designated are provided along the lower path of the conveyor link 20 to guide and provide tension to the link 20. As shown in FIGS. 5 to 7, the conveyor chain link 20 has secured thereto a plurality of transverse bars 78 at a regular interval, and to such bar 78 is secured a receptacle 21 for receiving the bottom of a container. The vertical shaft 8 carrying the sprocket wheel 7 is supported to be freely rotatable by means of a pair of vertically spaced bearings 16 and 17. A pair of guide rails 9 may be arranged between the outlet of the feeder 1 and the container supplying end of the conveyor chain link 20 for assuring during the transfer operation. In FIG. 1, the feeder 1 is shown by a step indicated at the left-most side of this good holding of the containers on the receptacles 21 figure, such step being provided to surround the whole length of the feeder chain 2 except at the feeder outlet to prevent lateral displacement of containers 4 from the space defined between adjacent pawls 3.

A sprocket wheel 23 is mounted on the same shaft 22' as the sprocket wheel 22 and a chain link 24 extends around the sprocket wheel 23 and a sprocket wheel 25 mounted on the output shaft of a reduction gear 26, which is coupled with the shaft of an electric motor 27. The drive from the motor 27 is also transmitted from a sprocket wheel 28 on the output shaft of the reduction gear 26 through a chain link 29 to an intermediate transmission assembly which comprises a chain link 30 extending around a series of sprocket wheels 31a to 31f, the sprocket 31c being vertically adjustable for the purpose to be described later and the sprocket 31f being mounted on a shaft 32. On the shaft 32 is mounted a gear 33 which is in meshing engagement with a gear 34 mounted on a shaft 35. The shaft 35 rigidly carries a belt pulley 36 and also a sprocket wheel 37, the latter being engaged by an upper chain link 38. A pair of sprockets 39 and 40 are arranged at a distance above a part of the upper span of the conveyor link 20, this distance being chosen close to the height of containers 4 so that the upper link 39 running between these sprockets 39, 40 lies level with top of the containers. The circulation path for the upper chain link 38 is provided by the above mentioned sprocket 37, sprockets 41 and 42 which are arranged above sprocket 39 and 40, respectively, a sprocket wheel 43 that is mounted on a shaft 44 and the sprocket 40, 39. An endless belt 45 extends around the belt pulley 36, another belt pulley 46 mounted on the shaft 44 and two guide rollers (not shown) similarly positioned as the sprockets 39, 40, there being further provided a tensioning roller 47 to engage the belt between the pulleys 36 and 46. As shown in FIG. 6, the belt 45 has an outer lining 48 formed of heat-resistant soft rubber such as foam rubber, and between the positions 40 and 39, its path is substantially coplanar or slightly below the upper chain link 38, as will be best seen in FIG. 5.

Referring again to FIG. 1, a sprocket 50 is mounted on the shaft 44, and a chain link 51 extends around the sprocket 50 and a sprocket 52 which is mounted on a shaft 53. The shaft 53 has mounted thereon a feed roller 54 which cooperates with an opposite roller 55 for feeding continuous web of heat shrinkable film 56. The film is supplied from a supply in the form of a roll 57 which is fitted on a mounting shaft 58 with fittings 59, two such mounting shafts 58 being provided on two arms of a support member 60 with one of the shafts carrying a reserve roll. The member 60 is an integral part of an upper support frame. For clarity of the drawing, such upper support frame is not shown in detail, but it is to be noted that sprockets 31f, 37, and 39 to 43, pulleys 36 and 46, and guide roller 47 and other guide rollers not designated but positioned at 39 and 40 are all mounted on such upper support frame which is vertically adjustable. Thus, when containers of different height are to be wrapped with heat shrinkable film, the vertical position of the upper support frame is adjusted so that the lining 48 of the belt 45 between positions 40 and 39 come to touch the top of the containers. The drive to the upper chain and belt system is maintained by vertical adjustment of the sprocket 31c. Guide rollers 61 and 62 are provided between the roll 57 and the feed rollers 54, 55. Suitable means, schematically indicated at 63, is provided to permit lateral positioning of the roll on the mounting shaft 58, since rolls of different film width must be used with varying diameter of containers. The reduction ratio between sprockets 50, 52 and the ratio of diameter between pulley 46 and roller 54 are selected so that the amount of feed for the film provided by the feed rollers 54, 55 is equal to that provided by the belt 45 when the film comes under it. It should be understood that conventional spring or friction means is used to urge the roll 57 clockwise, as viewed in FIG. 1, but to cause it to rotate counterclockwise under the action of the feed rollers 54, 55.

The upper chain link 38 is provided with a number of cutting units generally shown at 65, and the spacing between any adjacent units 65 is set to equal to that between the receptacles 21 on the conveyor link 20. It will be appreciated that each unit 65 interspaces adjacent containers 4 and the upper chain link 38 is driven at the same speed as the conveyor chain 20 so as to maintain the relative position between the units 65 on the chain 38 and the containers 4 on the conveyor 20. Obviously, the chain 38 must have a length which is a multiple of the spacing between units 65. In the embodiment shown in FIGS. 1 to 7, such unit comprises an electrical resistance wire 66 held tensioned between a pair of insulator supports 67, 68 which are secured to brackets 69, 70, respectively, mounted on and extending from opposite sides of the upper chain link 38 (FIG. 5). In FIG. 7, the resistance wire 66 is shown to comprise a pair of closely spaced parallel wires which are connected at one end. The other end of these wires are connected to terminals 71 which are mounted on the bracket 52 and electrically insulated therefrom. In order to energize the resistance wire 66, leads such as shown at 72 may be attached to the terminals 71 and connected across a power source. However, as will be described later with reference to FIG. 4, the time period during which the resistance wire 66 is to be energized must be controlled in timed relationship with the travel of containers between which a particular cutting unit 65 is positioned. To this end, instead of leads 72, brushes 73 may be attached to the bottom of the terminals 71 so as to engage contact rails 74, respectively, which may comprise spaced copper strips mounted on a bracket 75 of electrically insulating material secured to the upper support frame mentioned above. The position of the contact rails 74 is shown in broken lines in FIG. 1 and such rails are connected to a power source (not shown). In FIG. 5, reference numeral 76 denotes a pair of guide rails which, as is well known, are provided to engage the bottom of the upper chain 38 on both sides thereof for preventing the droop of the chain. The guide rails 76 are attached to the upper support frame previously described. Similar guide rails 77 are provided for the conveyor chain 20, but are secured to the lower or machine frame.

There is provided a ventilator 80 which supply forced flow of air through a conduit 81 and heater units each comprising a bank of electric heaters 82 are arranged in the conduit 81. The conduit 81 communicates with a hot air chamber 83 which has a plurality of nozzles 84 formed in its top plate which faces and extends parallel to the conveyor chain 20 at a position immediately following the contact rails 74 as seen in the direction of travel of the conveyor chain 20. At a position above such nozzles 84 and along one side of the tunnel-shaped space defined between the upper chain 38 and belt 45 on one hand and the conveyor chain 20 on the other, there is provided a suction port 85 which is connected through a duct 86 to the suction side of the ventilator 80. Baffle plates 87 are arranged within the hot air chamber 83 to direct air flow through the nozzles 84.

In order to control the temperature of the belt 45 or in order to prevent premature heat shrinkage of the film by the heat transmitted from an overheated lining 48 before the film is cut at 74, there is provided a cooling unit comprising a fan 90. Air flow from the fan 90 is conducted through a conduit 91 to a chamber 92 which has a number of orifices 93 formed in its bottom which faces the return path of the belt 45. This also serves to obtain a uniform temperature along the length of the belt 45.

In operation, containers 4 usually filled with content are supplied to the feeder table 1 and when the motor 27 is turned on, they are transferred from the feeder onto the conveyor 20. The transfer mechanism is well known in the art and does not form a part of the invention. However, a notch may be formed in the feeder at the outlet thereof and the conveyor 20 may be arranged to pass under the notch in close proximity, so that a container carried by the feeder chain 2 will be moved into the notch, and by virtue of synchronous operation, carried by a receptacle 21 which moves under the notch, the shoulder indicated on the receptacle then serving to hold the container against fall. As will be apparent, the drive ratio between the sprocket 18′ and sprockets 5, 7 is selected so that individual containers 4 delivered from the feeder occupy successive positions in the receptacles 21. When the machine is initially started with a new roll 57 of film, the free end of the film is pulled out manually, passed around rollers 61, 62 and between feed rollers 54, 55 and then inserted between the belt 45 and the top of a container which is about to move under the belt 45 at position 40. Thereafter, the film is automatically fed from the roll 57 by the positive feeding action of the rollers 54, 55 and is held tensioned by virtue of the lining 48 lightly pressing the film against the top rim of the containers 4 while the latter moves away from the position 40. Experiments have shown that the engagement of the belt 45 with the film on a single container is sufficient to keep the film length tensioned which extends between the feed roller 54 and the position 40. Referring to FIGS. 3 and 4, the film held between the belt 45 and a container 4 in a region designated by $a$ (FIG. 4) is depressed by the cutting unit 65. As the container further advances to pass by the contact rails 74 (FIG. 1), the unit is energized, whereupon the heat produced by the resistance wire 66 severs the film at position of engagement with the film (region $b$). Thereafter, hot air flow from the nozzles 84 is directed upward through the open space between the transverse bars 84 of the conveyor chain link 20 to the periphery of the container 4, thereby causing heat shrinkage of the film around the top rim of the container 4 (FIGS. 3$b$ and 3$c$). It should be understood that the ventilation 80 and the heating units 82 are energized during the operation of the machine. Preferably the cup-shaped container has an outwardly folded flange as shown in FIG. 4$d$, where it will be noted that heat shrinkage of the film produces forces of contraction which act in opposite directions, as indicated by arrows, on opposite sides of the flange, thereby providing a detent point to the shrinking film. This achieves a positive seal of the film with the container. After the containers 4 have thus been heat-sealed with the film, they continue to be carried on the conveyor 20 until the latter turns around the sprocket 22, whereupon sealed containers 4 are delivered to a suitable receiving system.

It will be noted that during the above process, the belt 45 is exposed to heat conveyed by the air flow from the nozzles 84 at its portion which is not covered by containers 4, thereby resulting in differential temperatures along its length. The belt may be cooled subsequently by air flow from the orifices 93, but it is essential that any significant build-up of heat does not occur in specific areas of the belt when it is run over repeated cycles. In order to achieve this, the total length of the belt 45 is chosen not to be an exact multiple of the spacing between successive receptacles 21 on the conveyor. In this way, it is ensured that a belt portion which was exposed to the heat in a preceding cycle will not be entirely exposed again to the heat so that during repeated cycles, the whole belt will be uniformly exposed to the heat. It has been found that this procedure achieved a successful operation of the machine even without the cooling means 92, 93. In fact, in most cases where the hot air from the nozzles 84 has a temperature between 120° C. and 150° C. depending upon the film material and thickness as well as the speed of travel of the conveyor 20 which may be 20 m./min. for example, the machine operated satisfactorily without the cooling means. This is considered partly due to the cooling effect of draft air through the tunnel defined between the belt 45 and the conveyor 20, and also due to the cooling effect during the return path of the belt.

Suitable film material is a heat shrinkable plastic material such as heat shrinkable vinyl chloride, polyethylene, polypropyrene or polystyrol. The film may have a thickness below 0.1 mm., preferably in the range between 15 and 70 microns. Containers formed of paper, pasteboard, hard plastic material, light metal or any other material having suitable high softening point may be used in the invention. It will be appreciated that when a container formed from such material is heat-sealed, the container has a relatively high heat capacity because it contains a content, so that the invention is applicable to a wide variety of containers of the kind which is presently used for retail sale of drinks, confectionary or other foodstuffs, though it is not intended that the invention should be limited to containers of such kind.

The quality of the seal provided by the automatic wrapping machine of the invention may be appreciated from the following observation on sample containers. When a seal was prepared in the manner described above, the film portion inside the top rim of the container had a tendency to droop or to be depressed slightly at its center when the wrapped container is sufficiently cooled. This is a result of air confined in the container becoming cooled and thus reduced in pressure. When a small perforation is formed in the film before heat shrinkage, the film portion across the opening of a wrapped container remained tight.

FIGS. 8 to 10 shows an alternative cutting unit 100 which takes the form of a blade having a saw-toothed edge. When the unit 100 is used in place of the cutting unit 65 shown in FIGS. 5 and 7, the cutting occurs at the beginning of the heat shrinkage process. Referring to FIG. 8, as soon as hot air is directed from the nozzles 84 to the film to cause its heat shrinkage, the film is highly tensioned with consequent cutting by the edge. The pressure of the belt 45 only need be great enough to prevent lateral displacement of the film portion held thereby.

While the invention has been particularly described in connection with an embodiment illustrated in the drawing, it should be obvious that various modifications are possible within the scope of the invention. Thus the invention may be applied to containers of cylindrical form with similar results. Therefore, it is intended that the invention is solely limited by the appended claims.

What is claimed is:

1. An automatic wrapping machine for continuously sealing top opening of cup-shaped containers with heat shrinkable film, comprising a chain conveyor carrying receptacles spaced apart along its length at a regular interval and having open space between adjacent receptacles, each of said receptacles being adapted to receive and hold a cup-shaped container thereon during its travel through a predetermined region, a supply of continuous web of heat shrinkable film, a soft belt of substantial width and an upper chain link both arranged to run parallel to, but spaced from the chain conveyor over a part of said predetermined region so that the belt is engageable with the rim of top opening of the container as it is carried on the chain conveyor, said belt serving when the machine is initially started to grip free end of said film between it and the rim to cause the film to cover the top opening and subsequently to keep the film lightly pressed against the rim of individual containers while at the same time serving to keep the film tensioned, said upper chain link being provided with a plurality of cutting means along its length at the same interval as said receptacles on the chain conveyor with each of the cutting means being positioned in said part to interspace adjacent receptacles, said upper chain link being driven at the same speed as the chain conveyor so as to cut the film transversely between adjacent receptacles while the film is held pressed by the belt, and means for applying heat through said open space to the cut film to thereby cause heat shrinkage of the cut film, whereby marginal portion of each individual cut film is sealed to the outer wall of the container.

2. An automatic wrapping machine according to claim 1 wherein means for controlling temperature length-wise of the belt is arranged along the path thereof at a position outside said part.

3. An automatic wrapping machine according to claim 1 wherein each of said cutting means comprise a blade extending the width of said film, said blade serving to cut the film when the latter is caused to shrink by heat.

4. An automatic wrapping machine according to claim 1 wherein the belt has a length which is not a multiple of said interval, whereby circulation of said belt over repeated cycles cause the whole length of the belt to be exposed uniformly to heat.

References Cited
UNITED STATES PATENTS

| | | | |
|---|---|---|---|
| 3,330,094 | 7/1967 | Ford | 53—329 |
| 3,014,320 | 12/1961 | Harrison | 53—42 |
| 3,099,115 | 7/1963 | McKibben et al. | |

THERON E. CONDON, Primary Examiner

H. M. CULVER, Assistant Examiner

U.S. Cl. X.R.
53—30, 42